United States Patent
Kim

(10) Patent No.: US 10,901,297 B2
(45) Date of Patent: Jan. 26, 2021

(54) RESONANT STRUCTURED OPTICAL TRANSISTOR

(71) Applicant: ELECTRONICS AND TELECOMMUNICATIONS RESEARCH INSTITUTE, Daejeon (KR)

(72) Inventor: Jongbae Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 127 days.

(21) Appl. No.: 16/200,241

(22) Filed: Nov. 26, 2018

(65) Prior Publication Data

US 2019/0163033 A1 May 30, 2019

(30) Foreign Application Priority Data

Nov. 24, 2017 (KR) .................. 10-2017-0158906
Nov. 20, 2018 (KR) .................. 10-2018-0143979

(51) Int. Cl.
*G02F 1/03* (2006.01)
*G02F 1/07* (2006.01)
(Continued)

(52) U.S. Cl.
CPC ............... *G02F 3/02* (2013.01); *G02F 1/377* (2013.01); *G02F 1/39* (2013.01); *G02F 2/004* (2013.01); *G02F 2203/15* (2013.01)

(58) Field of Classification Search
CPC ..... G02F 1/35; G02F 1/37; G02F 1/39; G02F 1/377; G02F 1/3534; G02F 2/004;
(Continued)

(56) References Cited

U.S. PATENT DOCUMENTS

| 4,382,660 A | 5/1983 | Pratt, Jr. et al. |
| 5,844,253 A | 12/1998 | Kim et al. |

(Continued)

FOREIGN PATENT DOCUMENTS

| KR | 100568504 B1 | 4/2006 |
| KR | 100857456 B1 | 9/2008 |

OTHER PUBLICATIONS

Chang-Qing Xu et al., "Intracavity wavelength conversions employing a MgO-doped LiNbO3 quasi-phase-matched waveguide and an erbium-doped fiber amplifier", J. Opt. Soc.Am. B, Oct. 2003, pp. 2142-2149, vol. 20, No. 10, Optical Society of America.

(Continued)

*Primary Examiner* — Mustak Choudhury

(57) ABSTRACT

A resonant-structured optical transistor includes a nonlinear medium which generates a second harmonic wave through second-order nonlinear interaction with an incident pump wave, and generates an amplified signal wave and a converted wave having a difference frequency through second-order nonlinear interaction between the incident signal wave and the second harmonic wave, a first mirror which transmits, to the nonlinear medium, the pump wave or the signal wave, and reflects the second harmonic wave on one surface of the nonlinear medium, and a second mirror which transmits the pump wave, the signal wave, or the converted wave, and reflects the second harmonic wave on another surface of the nonlinear medium. The pump wave is incident to the nonlinear medium through the first mirror in a first operation mode, and the pump wave and the signal wave are incident to the nonlinear medium through the first mirror in a second operation mode.

9 Claims, 6 Drawing Sheets

(51) Int. Cl.
*G02F 3/02* (2006.01)
*G02F 1/377* (2006.01)
*G02F 1/39* (2006.01)
*G02F 2/00* (2006.01)

(58) Field of Classification Search
CPC .... G02F 3/02; G02F 2203/15; G02F 2001/15; G02F 2001/2509; G02F 2001/3509; G02F 2001/3542; G02F 2001/3548; H01L 31/11; H01S 3/10; H01S 3/115; H01S 3/1083; H01S 3/107; H01S 3/109
USPC .................. 359/248, 326–330, 519; 356/432
See application file for complete search history.

(56) References Cited

U.S. PATENT DOCUMENTS

| | | | |
|---|---|---|---|
| 5,977,557 A | 11/1999 | Kim | |
| 6,101,023 A | 8/2000 | Meyer, Jr. et al. | |
| 6,167,067 A | 12/2000 | Meyer, Jr. et al. | |
| 6,282,014 B1 | 8/2001 | Long | |
| 7,209,282 B2 | 4/2007 | Kim et al. | |
| 7,782,469 B2 | 8/2010 | Kim | |
| 2005/0213194 A1* | 9/2005 | Kim | G02F 1/3534 359/328 |
| 2011/0181942 A1* | 7/2011 | Hashemi | G02F 1/353 359/329 |

OTHER PUBLICATIONS

Gerald T. Moore, "Resonant Sum-Frequency Generation", IEEE Journal of Quantum Electronics, Jan. 2002, pp. 12-18, vol. 38, No. 1, IEEE.

I. Brener et al., "Cascaded X(2) wavelength converter in LiNbO3, waveguides with counterpropagating beams", Electronics Letters, Jul. 8, 1999, pp. 1155-1157, vol. 35, No. 14, IEE.

Jongbae Kim, "Determination of the Optimum Resonance Length Leading to the Global Maximum Intensity of a Wave in a Resonator", Journal of the Korean Physical Society, Jun. 2011, pp. 1591-1598, vol. 58, No. 6.

\* cited by examiner

RESONANT STRUCTURED OPTICAL TRANSISTOR

CROSS-REFERENCE TO RELATED APPLICATIONS

This U.S. non-provisional patent application claims priority under 35 U.S.C. § 119 of Korean Patent Application No. 10-2017-0158906, filed on Nov. 24, 2017, and 10-2018-0143979, filed on Nov. 20, 2018, the entire contents of which are hereby incorporated by reference.

BACKGROUND

The present disclosure herein relates to an optical element, and more particularly, to a resonant-structured optical transistor.

Optical transistors may be used to construct various amplifiers, switches, logic gates, etc. Technology related to optical transistors has been developed since a long time ago in relation to the functions and roles of electric transistors. Attempts to apply various structures have been made to implement optical transistors. An all-optical transistor has been demonstrated on the basis of three-wave mixing in frequency-degenerated second-order nonlinear interaction. In such structures, input light may be amplified through interaction with a second harmonic wave. These structures use nonlinear cascading without requiring coherence between input light and pump light. Furthermore, these structures experimentally provide excellent performance with a large gain. Optical transistors in which these structures are applied may be used as wavelength converters while operating as switches or amplifiers.

However, the above-mentioned optical transistors do not exhibit amplification and switching characteristics equivalent to those of electric transistors. However, the demand for optical transistors capable of optical amplification or optical switching with ease is increasing.

SUMMARY

The present disclosure provides an optical transistor that enables implementation of optical amplification and optical switching with ease and simply.

An embodiment of the inventive concept provides a resonant-structured optical transistor including: a nonlinear medium configured to generate a second harmonic wave through second-order nonlinear interaction with an incident pump wave, and generate an amplified signal wave and a converted wave having a difference frequency through second-order nonlinear interaction between the incident signal wave and the second harmonic wave; a first mirror configured to transmit, to the nonlinear medium, the pump wave or the signal wave incident to the nonlinear medium, and reflects the second harmonic wave on one surface of the nonlinear medium; and a second mirror configured to transmit the pump wave, the signal wave, or the converted wave, and reflects the second harmonic wave on another surface of the nonlinear medium, wherein the pump wave is incident to the nonlinear medium through the first mirror in a first operation mode, and the pump wave and the signal wave are incident to the nonlinear medium through the first mirror in a second operation mode.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Exemplary embodiments of the inventive concept will be described in detail with reference to the accompanying drawings so that those skilled in the art can easily implement the inventive concept.

Figure 1:
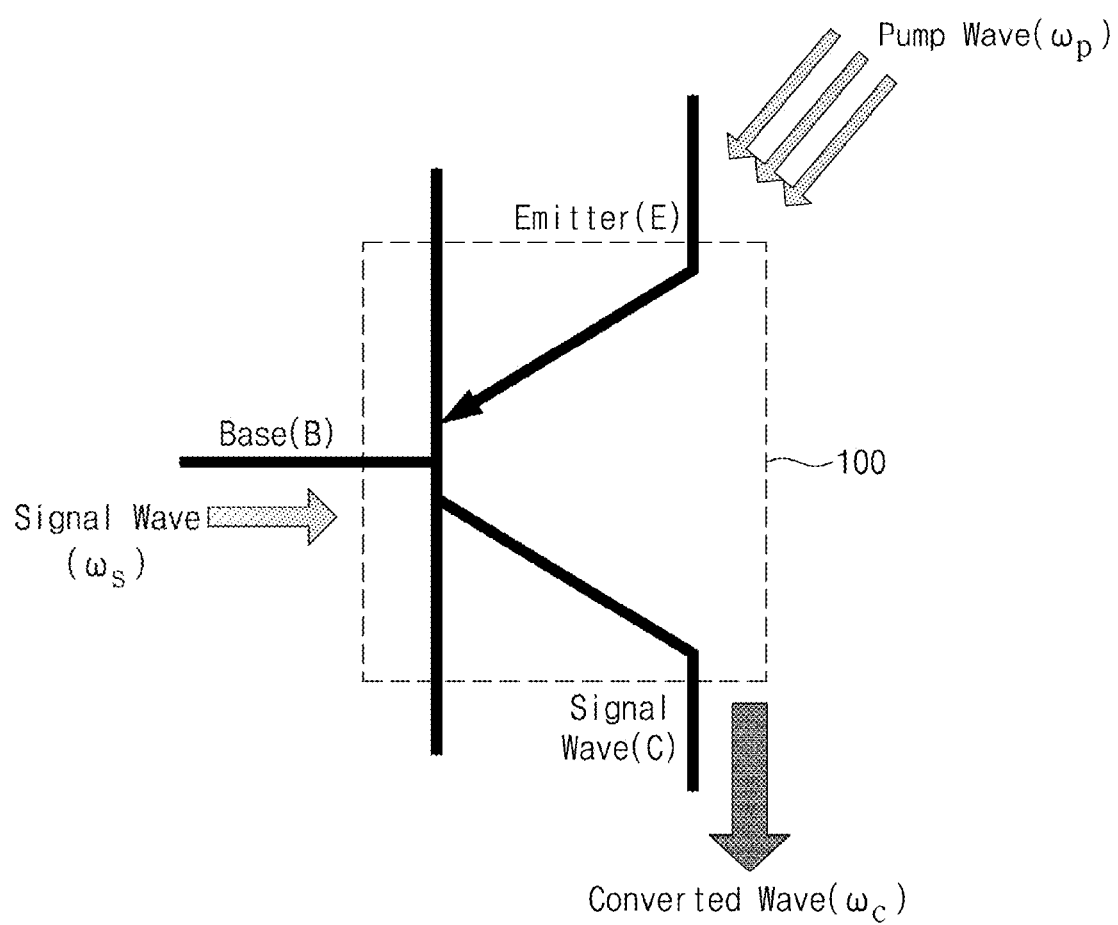
FIG. 1 is a diagram illustrating a schematic configuration of a resonant-structured optical transistor according to an embodiment of the inventive concept.

FIG. 1 is a diagram illustrating a schematic configuration of a resonant-structured optical transistor according to an embodiment of the inventive concept. Referring to FIG. 1, a resonant-structured optical transistor 100 of an embodiment of the inventive concept is capable of switching or amplifying a signal wave $\omega_s$ of a base B by a pump wave $\omega_p$ when the pump wave $\omega_p$ is input through an emitter E. To this end, the resonant-structured optical transistor 100 may include a nonlinear medium and a resonant structure.

The signal wave $\omega_s$ may be input to the base B of the resonant-structured optical transistor 100. Furthermore, the pump wave $\omega_p$ is input to the emitter E. Once the pump wave $\omega_p$ is input to the emitter E, a second harmonic wave $2\omega_p$ may be generated through a second-order nonlinear generation phenomenon. Here, once the signal wave $\omega_s$ is input to the base B, the signal wave $\omega_s$ amplified through a phenomenon of second-order nonlinear optical parametric amplification of the signal wave $\omega_s$ and the second harmonic wave $2\omega_p$, and a converted wave $\omega_c$ having a difference frequency may be output through a collector C. The emitter E, the base B, and the collector C are defined by the nonlinear medium and the resonant structure constituting the resonant-structured optical transistor 100. The resonant structure of the resonant-structured optical transistor 100 will be specifically described with reference to FIGS. 2 and 4.

Here, the resonant structure represents a structure which transmits the signal wave $\omega_s$, the pump wave $\omega_p$, and the converted wave $\omega_c$, but does not transmit the second harmonic wave $2\omega_p$ to the outside of the nonlinear medium so that the second harmonic wave $2\omega_p$ reciprocates or circulates therein. For example, the resonant structure may be configured in various forms such as 2 reflection mirrors, grating mirrors in the nonlinear medium, optical fiber loop mirrors, or optical fiber loop resonator.

Figure 2:
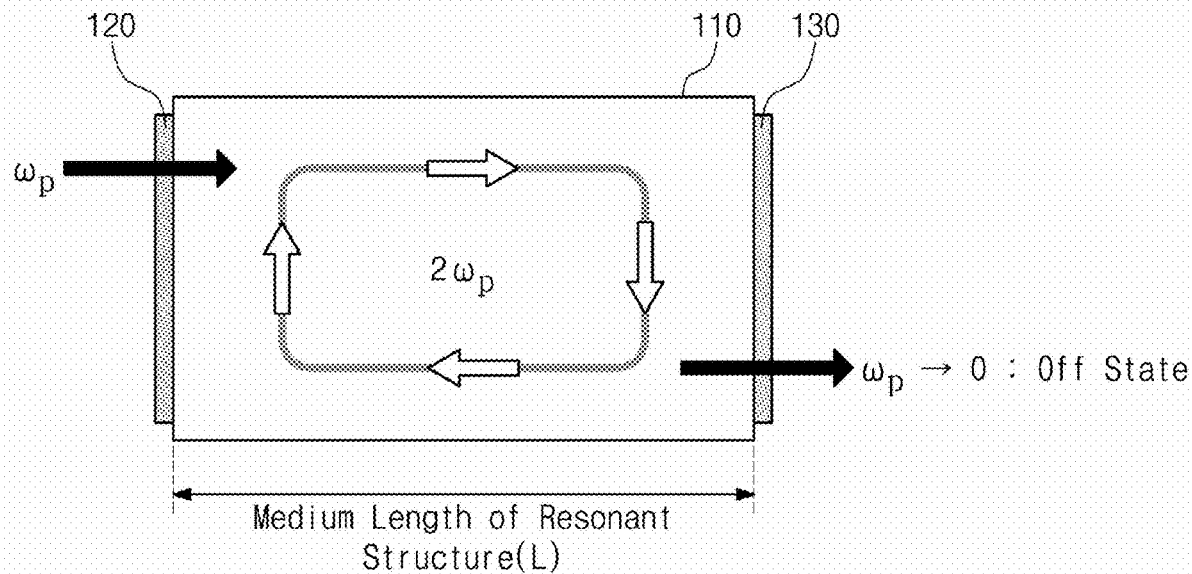
FIG. 2 is a diagram illustrating an off state of a resonant-structured optical transistor according to an embodiment of the inventive concept.

FIG. 2 is a diagram illustrating an off state of the resonant-structured optical transistor 100 according to an embodiment of the inventive concept. Referring to FIG. 2, the resonant-structured optical transistor 100 includes a nonlinear medium 110, a first mirror 120, and a second mirror 130.

The nonlinear medium 110 is located in a path that is the same as a path through which light waves travel. The nonlinear medium 110 may be formed of materials having inherent second-order nonlinearity or capable of inducing second-order nonlinearity through polarization, such as crystals, semiconductors, silica, polymer, etc. The nonlinear medium 110 may be formed as an optical waveguide or an optical fiber to reduce a propagation loss of light waves and improve efficiency of nonlinear interaction. The nonlinear medium 110 may be configured to satisfy a phase matching condition required for light waves to be mixed. In an embodiment of the inventive concept, the nonlinear medium 110 may be provided with a medium length L for constituting the resonant structure.

The first mirror 120 may be disposed on one surface of the nonlinear medium 110 to which the pump wave $\omega_p$ is incident. Furthermore, the second mirror 130 may be disposed on another surface of the nonlinear medium 110 in parallel to the first mirror 120. The first mirror 120 and the second mirror 130 have a characteristic of transmitting light such as the pump wave $\omega_p$, the signal wave $\omega_s$, and the converted wave $\omega_c$. However, each of the first mirror 120 and the second mirror 130 has a characteristic of selectively reflecting only the second harmonic wave $2\omega_p$ of the pump wave $\omega_p$. Therefore, once the pump wave $\omega_p$ is incident to the first mirror 120, the incident pump wave $\omega_p$ generates the second harmonic wave $2\omega_p$ by virtue of the nonlinear medium 110 inside the resonant structure. However, the generated second harmonic wave $2\omega_p$ is selectively reflected by the first mirror 120 and the second mirror 130 facing each other in parallel. Therefore, the second harmonic wave $2\omega_p$ of the pump wave $\omega_p$ constitutes a resonant wave of the second harmonic wave $2\omega_p$ while reciprocating between the first mirror 120 and the second mirror 130.

The pump wave $\omega_p$ may be incident to one surface of the first mirror 120. Furthermore, the pump wave $\omega_p$ or the signal wave $\omega_s$, or the converted wave $\omega_c$ may be transmitted and output from the second mirror 130 disposed on the other surface of the nonlinear medium 110. The pump wave $\omega_p$ or the signal wave $\omega_s$ may be input to a side of the first mirror 120 directly from a light source (e.g., a laser diode) or after being guided by an optical fiber. Likewise, the pump wave $\omega_p$ or the signal wave $\omega_s$, or the converted wave $\omega_c$ which are transmitted through the second mirror 130 in the nonlinear medium 110 may be directly output or may be guided by an optical fiber in order to be output.

In particular, in the resonant-structured optical transistor 100 of an embodiment of the inventive concept, the pump wave $\omega_p$ which has not undergone a second-order nonlinear phenomenon may be incident to a side of the second mirror 130 in order to be output. However, if the medium length L for providing the resonant structure of the nonlinear medium 110 is appropriately set with respect to an intensity of the input pump wave $\omega_p$, the output of the pump wave $\omega_p$ may converge to '0' due to conversion into the second harmonic wave $2\omega_p$ and a medium loss. Therefore, the output of the pump wave $\omega_p$ may be set to '0' by using the length of the resonant structure.

The first mirror 120 and the second mirror 130 for forming the resonant structure may be implemented in various ways. In a certain embodiment of the inventive concept, the first mirror 120 and the second mirror 130 may be implemented as dielectric mirrors arranged on two sides of the nonlinear medium 110. In another embodiment of the inventive concept, the first mirror 120 and the second mirror 130 may be implemented as optical fiber lattice mirrors arranged on two sides of the nonlinear medium 110. In another embodiment of the inventive concept, the first mirror 120 and the second mirror 130 may be implemented as optical mirrors arranged on two sides of the nonlinear medium 110. Here, it may be understood that the nonlinear medium 110 and the first mirror 120 and the second mirror 130 arranged on two sides thereof for forming the resonant structure may be variously changed or modified in order to be implemented.

Figure 3:
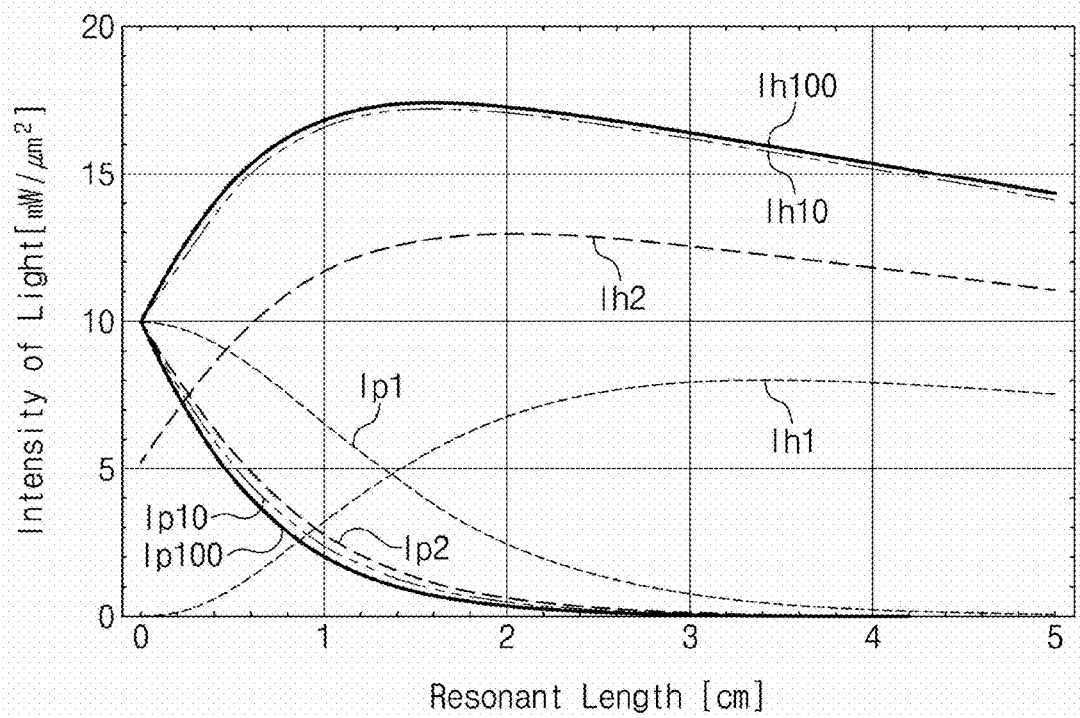
FIG. 3 is a graph illustrating a simulation result showing a '0' state output of the resonant-structured optical transistor of FIG. 2.

FIG. 3 is a graph illustrating a simulation result showing a '0' state output of the resonant-structured optical transistor of FIG. 2. It is recognized from FIG. 3 that if the medium length L of the resonant structure is about 3 cm under a given condition, the intensity of the output pump wave $\omega_p$ is in a '0' state. The vertical axis of the graph represents the intensity of light (mW/μm²), while the horizontal axis represents the medium length L of the resonant structure. The curves in the graph indicate intensities Ip1, Ip2, Ip10, and Ip100 of the pump wave $\omega_p$ and intensities Ih1, Ih2, Ih10, and Ih100 of the second harmonic wave $2\omega_p$ according to the number of resonance if the pump wave $\omega_p$ is input.

Described below are the curves indicating the intensities Ih1, Ih2, Ih10, and Ih100 of the second harmonic wave $2\omega_p$ according to the number of resonance in the nonlinear medium 110 of the resonant-structured optical transistor 100. The intensity Ih1 of the second harmonic wave $2\omega_p$ gradually increases from 0 mw/μm² from a point at which a resonant length of the nonlinear medium 110 is about '0 cm' if the number of resonance is 1. Furthermore, the intensity Ih2 of the second harmonic wave $2\omega_p$ starts to increase at a point at which the length of the nonlinear medium 110 is '0' and starts to decrease at a point at which the resonant length is about '2 cm' if the number of resonance is 2. However, the intensity Ih2 of the second harmonic wave $2\omega_p$ increases from about 5 mW/μm² from the point at which the resonant length is '0 cm'. The intensity Ih10 of the second harmonic wave $2\omega_p$ starts to increase at the point at which the length of the nonlinear medium 110 is '0' and starts to decrease at a point at which the resonant length is about '1.5 cm' if the number of resonance is 10. At the point at which the resonant length is about '1.5 cm', the intensity Ih100 of the second harmonic wave $2\omega_p$ is about 1.7 times the intensity of the incident pump wave $\omega_p$. This tendency becomes more obvious as the intensity of the pump wave $\omega_p$ increases.

Described below are the curves indicating the intensities Ip1, Ip2, Ip10, and Ip100 of the pump wave $\omega_p$ according to the number of resonance in the nonlinear medium 110 of the resonant-structured optical transistor 100. The pump wave $\omega_p$ is incident with the intensity Ip1 of about 10 mW/μm² at the point at which the resonant length of the nonlinear medium 110 is about '0 cm' if the number of resonance is 1. Then, the intensity of light gradually decreases. Furthermore, it is recognized that when the number of resonance is 2, the pump wave $\omega_p$ is incident with the intensity Ip2 of about 10 mW/μm² at the point at which the resonant length of the nonlinear medium 110 is '0', and the intensity decreases more rapidly in comparison with the case where the number of resonance is 1. Furthermore, the intensities Ip10 and Ip100 of the pump wave $\omega_p$ decrease with an increasing resonant length. However, it is recognized that the intensity of the pump wave $\omega_p$ decreases to nearly 0 mW/$\mu$m² at a point at which the resonant length L is about '3 cm'.

According to the above-mentioned simulation result, it may be understood that the output of the pump wave $\omega_p$ may be set to '0' by appropriately adjusting the resonant length of the nonlinear medium 110 of the resonant-structured optical transistor 100 of an embodiment of the inventive concept with respect to the intensity of the input pump wave $\omega_p$. In addition, it may be understood that the intensity of the second harmonic wave $2\omega_p$ which resonates internally is amplified to about 1.7 times the intensity of the incident pump wave $\omega_p$. As described above, a resonant length that maximizes an effect of amplification of the second harmonic wave $2\omega_p$ may be determined according to the resonant length and the intensity of the incident pump wave $\omega_p$.

Figure 4:
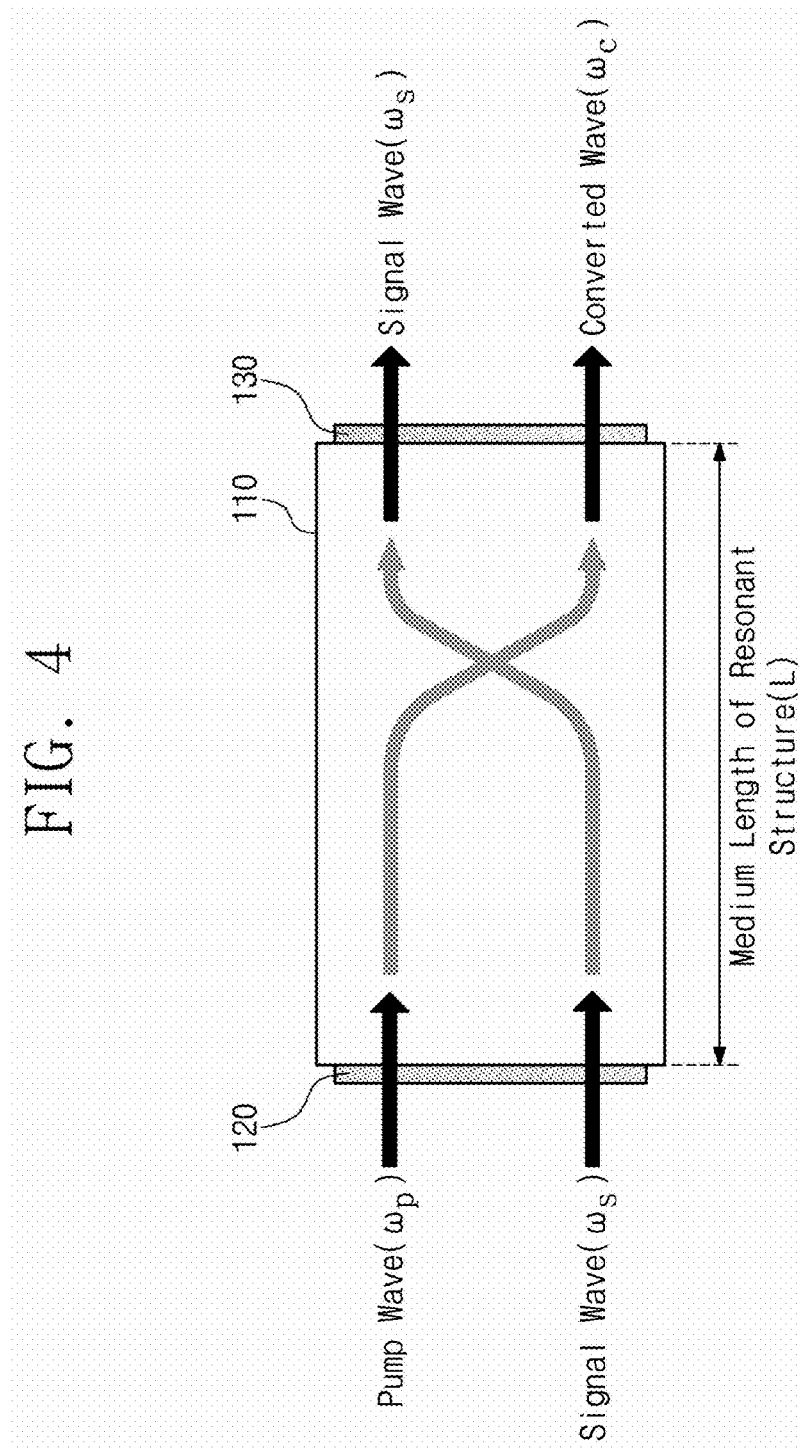
FIG. 4 is a diagram illustrating an on state of a resonant-structured optical transistor according to an embodiment of the inventive concept.

FIG. 4 is a diagram illustrating an on state of the resonant-structured optical transistor according to an embodiment of the inventive concept. Referring to FIG. 4, the resonant-structured optical transistor 100 includes the nonlinear medium 110, the first mirror 120, and the second mirror 130. The pump wave $\omega_p$ and the signal wave $\omega_s$ may be incident to one surface of the first mirror 120 forming an input stage of the resonant-structured optical transistor 100. Then, the signal wave $\omega_s$ and the converted wave $\omega_c$ are output after being transmitted through the second mirror 130 forming an output stage.

Once the pump wave $\omega_p$ and the signal wave $\omega_s$ are incident to the side of the first mirror 120, the second-order nonlinear parametric amplification occurs due to the signal wave $\omega_s$ and the second harmonic wave $2\omega_p$ generated by the pump wave $\omega_p$ as described above with reference to FIG. 2. Then, amplification of the signal wave $\omega_s$ occurs. This signal wave $\omega_s$ may be output to the outside after being transmitted through the second mirror 130 of the resonant-structured optical transistor 100.

Furthermore, the converted wave $\omega_c$ generated due to interaction between the pump wave $\omega_p$ and the signal wave $\omega_s$ are output to the outside after being transmitted through the second mirror 130. Therefore, it may be understood that a '1 (on)' state of the resonant-structured optical transistor 100 may be induced by inputting the signal wave $\omega_s$. If the converted wave $\omega_c$ and the amplified signal wave $\omega_s$ are indiscriminately measured or used according to an experimental configuration and measurement condition, an output wave of the resonant-structured optical transistor 100 is a sum of the amplified signal wave $\omega_s$ and the converted wave $\omega_c$ in the '1 (on)' state. If the pump wave $\omega_p$ and the signal wave $\omega_s$ having the same wavelength are input from different light sources, the wavelengths of the pump wave $\omega_p$ and the signal wave $\omega_s$ are not physically ideally identical, and thus the converted wave $\omega_c$ has the same wavelength as the pump wave $\omega_p$ due to the above-mentioned optical parametric amplification phenomenon. Then, the converted wave $\omega_c$ may be output to the outside together with the amplified signal wave $\omega_s$. The amplification function caused by the above-mentioned cascaded second-order cascaded optical parametric amplification phenomenon may be enhanced depending on a resonant structure.

Figure 5:
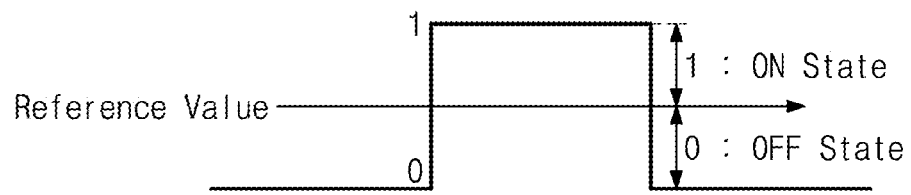
FIG. 5 is wave diagram illustrating an on/off differentiating method according a switching operation of a resonant-structured optical transistor.

FIG. 5 is wave diagram illustrating an on/off differentiating method according a switching operation of a resonant-structured optical transistor. Referring to FIG. 5, an operation state ('on' or 'off') or a logic state ('0' or '1') of an output of the resonant-structured optical transistor 100 may be determined according to whether an optical wave is output from an output stage or not.

The intensity of an output optical wave may be compared with a reference value in order to determine a logical value of the output optical wave detected at the output stage of the side of the second mirror 130 (see FIG. 4). If the intensity of the output optical wave is smaller than the reference value, the operation state of the resonant-structured optical transistor 100 may be determined to be the off state. Alternatively, the logical value of the output optical wave may be determined to be logic '0'. On the contrary, if the intensity of the output optical wave is larger than the reference value, the operation state of the resonant-structured optical transistor 100 may be determined to be the on state. Alternatively, the logical value of the output optical wave may be determined to be logic '1'.

Figure 6:
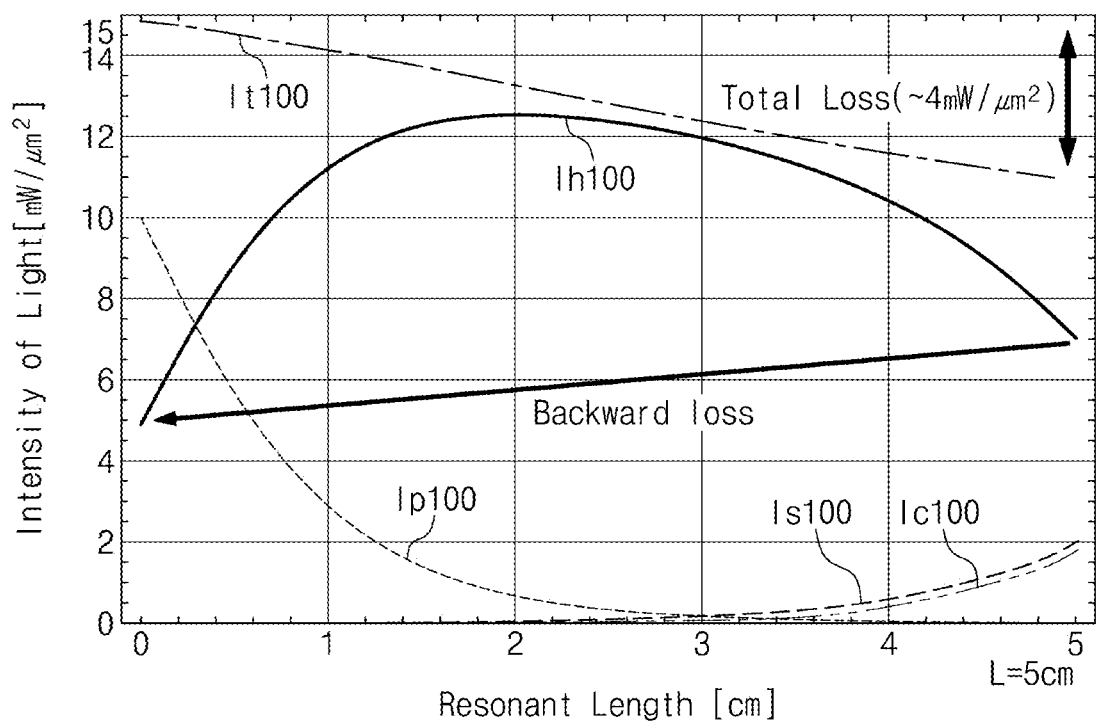
FIG. 6 is a graph illustrating intensities of signals in an on state of a resonant-structured optical transistor.

FIG. 6 is a graph illustrating intensities of signals in an on state of a resonant-structured optical transistor. Referring to FIG. 6, if the pump wave $\omega_p$ and the signal wave $\omega_s$ are input, the converted wave $\omega_c$ is generated together with the amplified signal wave $\omega_s$. Furthermore, the signal wave $\omega_s$ and the converted wave $\omega_c$ are output to the output stage. Here, intensities Ih100, Ip100, Is100, Ic100, and It100 of lights in the resonant structure represent intensities if the number of resonance is 100. Here, it would be understood that the number 100 is merely an exemplary number indicating a saturated state of a corresponding optical wave due to resonance.

If the pump wave $\omega_p$ and the signal wave $\omega_s$ are input, the second harmonic wave $2\omega_p$ is generated in the nonlinear medium 110. The intensity Ih100 of the second harmonic wave $2\omega_p$ has the largest value at a point at which the resonant length is about 2 cm and has small values at the input stage and the output stage as described above with reference to FIG. 3. Furthermore, the intensity Ip100 of the incident pump wave $\omega_p$ starts to decrease at a point which corresponds to the input stage and at which the resonant length is about 0 cm, and converges to nearly 0 at a point at which the resonant length is about 3 cm.

However, the intensity Is100 of the signal wave $\omega_s$ gradually increases with an increasing resonant length although the intensity Is100 of the signal wave $\omega_s$ is weak. The converted wave $\omega_c$ is generated through interaction between the signal wave $\omega_s$ and the second harmonic wave $2\omega_p$. It is recognized that the intensity Ic100 of the converted wave $\omega_c$ increases with an increasing resonant length although the intensity Ic100 of the converted wave $\omega_c$ is weak. In addition, with regard to the curve It100 which indicates a sum of the intensities of all optical waves, it is recognized that a total loss of each traveling wave reaches about 4 mW/$\mu$m² at a point at which the resonant length L is about 5 cm. In the case of the second harmonic wave $\omega_p$, a backward loss may occur due to reflection. From an aspect of energy conservation, an energy loss of the incident pump wave $\omega_p$ and the signal wave $\omega_s$ exhibits as a sum of losses due to traveling waves and a loss due to resonance of the second harmonic wave $2\omega_p$ in the nonlinear medium 110.

If the pump wave $\omega_p$ and the signal wave $\omega_s$ are simultaneously incident to the resonant-structured optical transistor 100 of an embodiment of the inventive concept, the converted wave $\omega_c$ is newly generated and output together with the amplified signal wave $\omega_s$. Therefore, it may be understood that the '1 (on)' state of the resonant-structured optical transistor 100 is induced with respect to input/output. That is, it may be understood that the resonant-structured optical transistor 100 of an embodiment of the inventive concept, in which characteristics of a second-order nonlinear medium are combined with characteristics of a resonant structure, has characteristics equivalent to characteristics of an electric transistor.

An optical intensity transfer ratio α indicating a transistor characteristic of the resonant-structured optical transistor 100 may be expressed as Equation (1) as below.

$$\alpha = \frac{I_C}{I_E} = (Ip_{100}[L] + Is_{100}[L] + Ic_{100}[L])/Ip_1[0] = 0.39 \quad (1)$$

where L denotes the length of the resonant structure.

The optical intensity transfer ratio α is calculated as 0.39 when the intensity of the input pump wave $\omega_p$ is about 10 mW/μm² although the optical intensity transfer ratio may vary according to the intensity of input light. An amplification factor β of the resonant-structured optical transistor 100 may be expressed as Equation (2) as below.

$$\beta = \frac{I_C}{I_B} = (Ip_{100}[L] + Is_{100}[L] + Ic_{100}[L])/Is_1[0] = 393.9 \quad (2)$$

Figure 7:
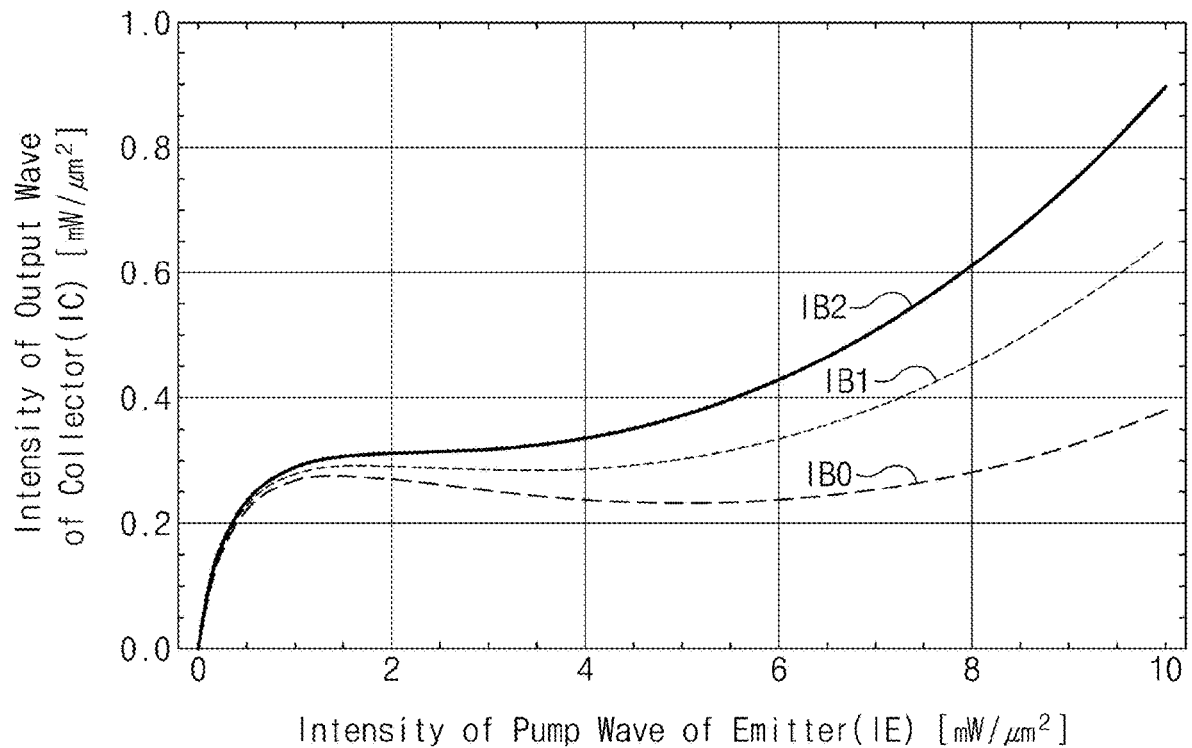
FIG. 7 is a graph schematically illustrating characteristics of a resonant-structured optical transistor according to an embodiment of the inventive concept.

FIG. 7 is a graph schematically illustrating characteristics of a resonant-structured optical transistor according to an embodiment of the inventive concept. Referring to FIG. 7, the resonant-structured optical transistor 100 of an embodiment of the inventive concept does not have a variable corresponding to a voltage, unlike an electric transistor. Thus, a change in the intensity of an output wave of the collector C relative to the intensity of the pump wave $\omega_p$ incident to the emitter E will be described. Here, the intensity IE of the output wave of the collector C varies according to the intensity IB of the signal wave $\omega_s$ input to the base B.

Described below is a change in the intensity IC of the output wave of the collector C relative to the intensity of the pump wave $\omega_p$ incident to the emitter E if the intensity of the signal wave $\omega_s$ input to the base B is about 0.005 mW/μm² (i.e., IB0). The intensity IE of the pump wave $\omega_p$ increases from about 0 to about 10 mW/μm². In comparison with this intensity, the intensity IC of the output wave slightly decreases if the intensity IE of the pump wave $\omega_p$ ranges from about 1.2 mW/μm² to about 6 mW/μm², but is considered to maintain a certain level.

Described below is a change in the intensity IC of the output wave of the collector C relative to the intensity of the pump wave $\omega_p$ incident to the emitter E if the intensity of the signal wave $\omega_s$ input to the base B is about 0.010 mW/μm² (i.e., IB1). The intensity IC of the output wave rapidly increases if the intensity IE of the pump wave $\omega_p$ ranges from about 0 to about 1.2 mW/μm². However, the intensity IC of the output wave is considered to maintain a certain level if the intensity IE of the pump wave $\omega_p$ ranges from about 1.2 mW/μm² to about 4 mW/μm². Furthermore, the intensity IC of the output wave increases in a divergence form if the intensity IE of the pump wave $\omega_p$ increases from about 6 mW/μm².

If the intensity of the signal wave $\omega_s$ is about 0.015 mW/μm² (i.e., IB2), the intensity IC of the output wave rapidly increases if the intensity IE of the pump wave $\omega_p$ ranges from about 0 to about 1.2 mW/μm². However, the intensity IC of the output wave is considered to maintain a certain level if the intensity IE of the pump wave $\omega_p$ ranges from about 1.2 mW/μm² to about 4 mW/μm². Furthermore, the intensity IC of the output wave increases in a divergence form if the intensity IE of the pump wave $\omega_p$ increases from about 4 mW/μm².

In view of the above-described graph, the intensity IE of the pump wave $\omega_p$ of the resonant-structured optical transistor 100 of an embodiment of the inventive concept may correspond to an emitter current IE in a characteristic curve of an electric transistor. Furthermore, the intensity IB of the signal wave $\omega_s$ of the resonant-structured optical transistor 100 may correspond to a base current $I_B$ in the characteristic curve of an electric transistor. Furthermore, the intensity IC of the output wave of the resonant-structured optical transistor 100 may correspond to a collector current $I_C$ in the characteristic curve of an electric transistor. In consideration of the correspondence relationship between characteristics, operation characteristics of the resonant-structured optical transistor 100 of an embodiment of the inventive concept may be considered to be similar to characteristics of an electric transistor.

As described above, the intensity of the output wave of the collector C relative to the intensity of the pump wave $\omega_p$ incident to the emitter E exhibits amplification and switching characteristics similar to those of an electric transistor in a specific intensity range of the pump wave $\omega_p$. Furthermore, there exists a divergence region which is similar to a breakdown region of an electric transistor.

Figure 8:
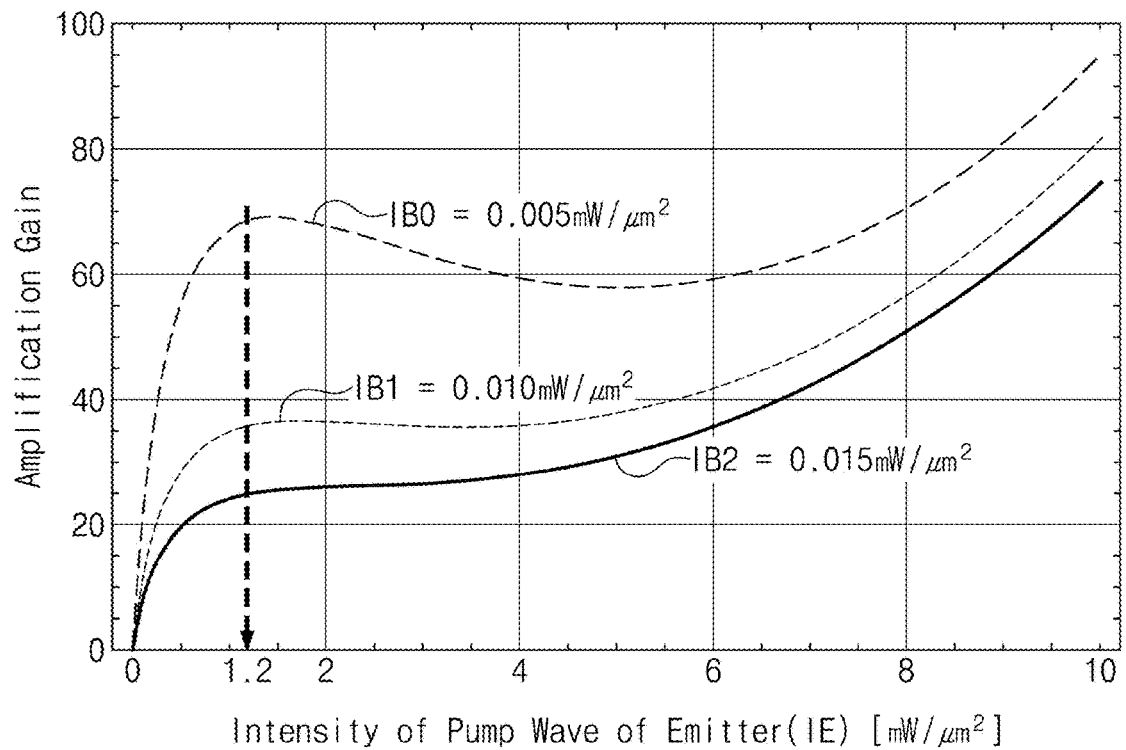
FIG. 8 is a graph schematically illustrating an amplification factor of a resonant-structured optical transistor according to an embodiment of the inventive concept.

FIG. 8 is a graph schematically illustrating an amplification factor of a resonant-structured optical transistor according to an embodiment of the inventive concept. Referring to FIG. 8, the amplification factor β of the resonant-structured optical transistor 100 has a gain value of about 20 to about 55 in a region in which amplification is possible according to the intensity IB of the signal wave $\omega_s$ incident to the base B.

A gain curve (i.e., IB0) for the signal wave $\omega_s$ of about 0.005 mW/μm² will be exemplarily described. The gain increases to about 55 at a point at which the intensity IE of the pump wave $\omega_p$ is about 1.2 mW/μm². Thereafter, it is observed that the gain decreases until a time point at which the intensity IE of the pump wave $\omega_p$ is about 5 mW/μm², and then increases again.

The gain (IB1) for the signal wave $\omega_s$ of about 0.010 mW/μm² is relatively lower than the gain (IB0) for the signal wave $\omega_s$ of about 0.005 mW/μm². The gain increases until a point at which the intensity IE of the pump wave $\omega_p$ is about 1.2 mW/μm², and thereafter maintains a certain level until a point at which the intensity IE of the pump wave $\omega_p$ is about 4 mW/μm². The gain starts to increase again at a point at which the intensity IE of the pump wave $\omega_p$ is about 4 mW/μm².

The gain (IB2) for the signal wave $\omega_s$ of about 0.015 mW/μm² is relatively lower than the gain (IB1) for the signal wave $\omega_s$ of about 0.010 mW/μm². Here, the gain increases until a point at which the intensity IE of the pump wave $\omega_p$ is about 1.2 mW/μm², and thereafter maintains a certain level until a point at which the intensity IE of the pump wave $\omega_p$ is about 4 mW/μm². The gain starts to increase again at a point at which the intensity IE of the pump wave $\omega_p$ is about 4 mW/μm².

In view of the above-mentioned gain curves, the gain has a value of about 20 to about 55 in an operation region in which amplification by the resonant-structured optical transistor 100 is possible.

Figure 9:
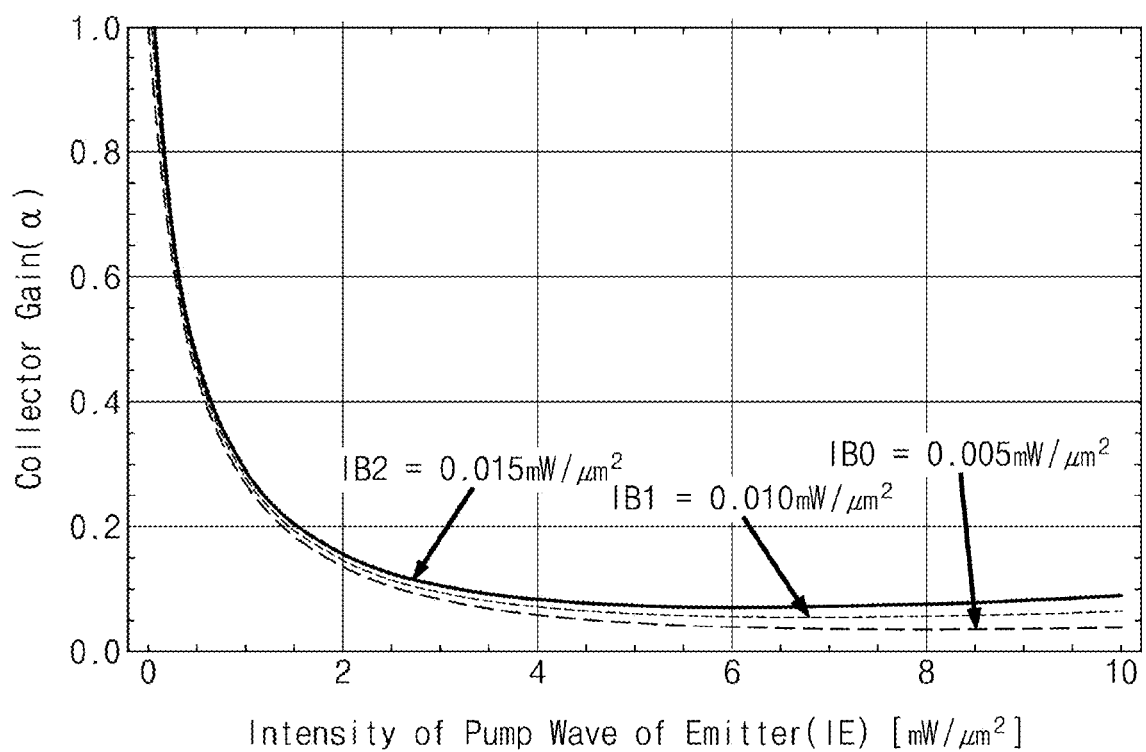
FIG. 9 is a graph illustrating characteristics of a transfer ratio of a resonant-structured optical transistor according to an embodiment of the inventive concept.

FIG. 9 is a graph illustrating characteristics of a transfer ratio of a resonant-structured optical transistor according to an embodiment of the inventive concept. Referring to FIG. 9, the transfer ratio α of the resonant-structured optical transistor 100 exhibits a very low value according to the intensity IB of the signal wave $\omega_s$ incident to the base B. The transfer ratio $\alpha$ represents a ratio of an intensity of an optical wave transferred from the emitter E to the collector C.

A transfer ratio curve (i.e., IB0) for the signal wave $\omega_s$ of about 0.005 mW/μm² will be described. It may be recognized that the transfer ratio $\alpha$ logarithmically decreases according to the intensity IE of the pump wave $\omega_p$. It may be recognized that a transfer ratio curve (i.e., IB1) for the signal wave $\omega_s$ of about 0.010 mW/μm² is less decreased in comparison with the transfer ratio curve IB0. This tendency occurs in a transfer ratio curve (i.e., IB3) for the signal wave $\omega_s$ of about 0.015 mW/μm².

The resonant-structured optical transistor 100 has a very low transfer ratio $\alpha$. This is because a long length of an element (or a nonlinear medium) for the resonant structure causes a large loss. A high intensity of an incident optical wave makes it possible to manufacture an optical transistor having a short resonant length. In this case, the length of an element is short, and thus the loss decreases and the value of the transfer ratio is expected to increase.

If the optical transistor according to an embodiment of the inventive concept is used, amplification or switching of an optical signal may be implemented with ease. Therefore, by applying the optical transistor of an embodiment of the inventive concept, an optical amplification/switching element, a logic gate element, high-speed communication such as all-optical communication, a processor of an optical computer, and an optical circuit for driving a circuit by photon may be implemented with ease.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A resonant-structured optical transistor comprising: a nonlinear medium configured to generate a second harmonic wave through second-order nonlinear interaction with an incident pump wave, and generate an amplified signal wave and a converted wave having a difference frequency through second-order nonlinear interaction between an incident signal wave and the second harmonic wave; a first mirror configured to transmit, to the nonlinear medium, the pump wave or the signal wave incident to the nonlinear medium, and reflect the second harmonic wave on one surface of the nonlinear medium; and a second mirror configured to transmit the pump wave, the signal wave, or the converted wave, and reflect the second harmonic wave on another surface of the nonlinear medium, wherein the pump wave is incident to the nonlinear medium through the first mirror in a first operation mode, and the pump wave and the signal wave are incident to the nonlinear medium through the first mirror in a second operation mode, in the first operation mode, a resonant length of the nonlinear medium is provided as a length that allows an intensity of the pump wave output through the second mirror to converge to '0', and in the second operation mode, a logical value of output waves is determined according to an intensity of the output waves obtained by combining the signal wave and the converted wave transmitted through the second mirror.

2. The resonant-structured optical transistor of claim 1, wherein the logical value of the output wave is determined as logic '1' if the intensity of the output wave is higher than a reference intensity, and is determined as logic '0' if the intensity of the output wave is equal to or lower than the reference intensity.

3. The resonant-structured optical transistor of claim 1, wherein in the second operation mode, the pump wave and the signal wave have the same wavelength.

4. The resonant-structured optical transistor of claim 3, wherein in the second operation mode, the amplified signal wave and the converted wave are transmitted through the second mirror.

5. The resonant-structured optical transistor of claim 4, wherein the converted wave has the same wavelength as that of the pump wave.

6. The resonant-structured optical transistor of claim 1, wherein the first operation mode corresponds to a switch mode, and the second operation mode corresponds to an amplification mode in which the signal wave is amplified by the second harmonic wave.

7. The resonant-structured optical transistor of claim 1, wherein each of the first mirror and the second mirror comprises at least one of a dielectric mirror, an optical fiber lattice mirror, or an optical mirror.

8. The resonant-structured optical transistor of claim 1, wherein the nonlinear medium comprises at least one of a crystal, a semiconductor, silica, or polymer having inherent second-order nonlinearity.

9. The resonant-structured optical transistor of claim 1, wherein the nonlinear medium comprises a material that induces second-order nonlinearity through polarization.

* * * * *

UNITED STATES PATENT AND TRADEMARK OFFICE
CERTIFICATE OF CORRECTION

PATENT NO. : 10,901,297 B2
APPLICATION NO. : 16/200241
DATED : January 26, 2021
INVENTOR(S) : Jongbae Kim It is certified that error appears in the above-identified patent and that said Letters Patent is hereby corrected as shown below:

In the Drawings

Sheet 1, Fig. 1, the legend "Signal Wave (C)" should be changed to --Collector (C)--.

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*